No. 761,752. PATENTED JUNE 7, 1904.
J. H. BOGGESS & W. HOTZE.
COMBINATION HAY IMPLEMENT.
APPLICATION FILED APR. 21, 1903.
NO MODEL. 4 SHEETS—SHEET 3.
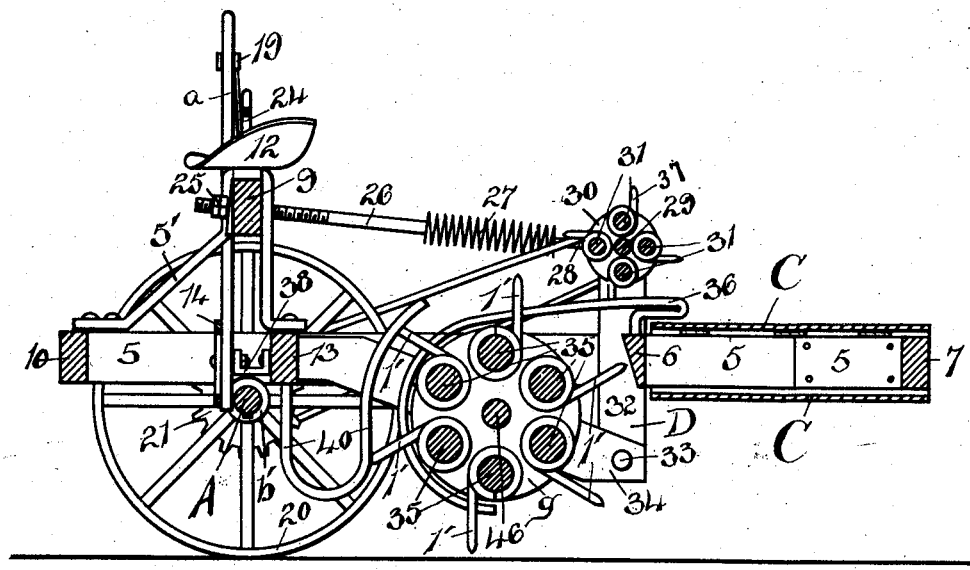
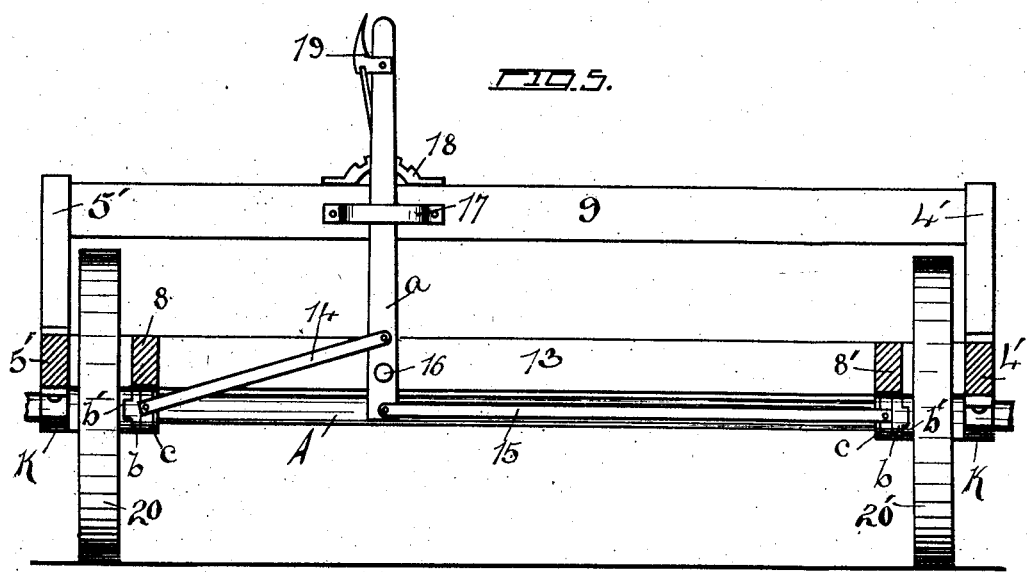
WITNESSES:
T. J. Larson
H. P. Baker
INVENTORS
James H. Boggess
William Hotze
BY Geo. W. Ives
Attorney

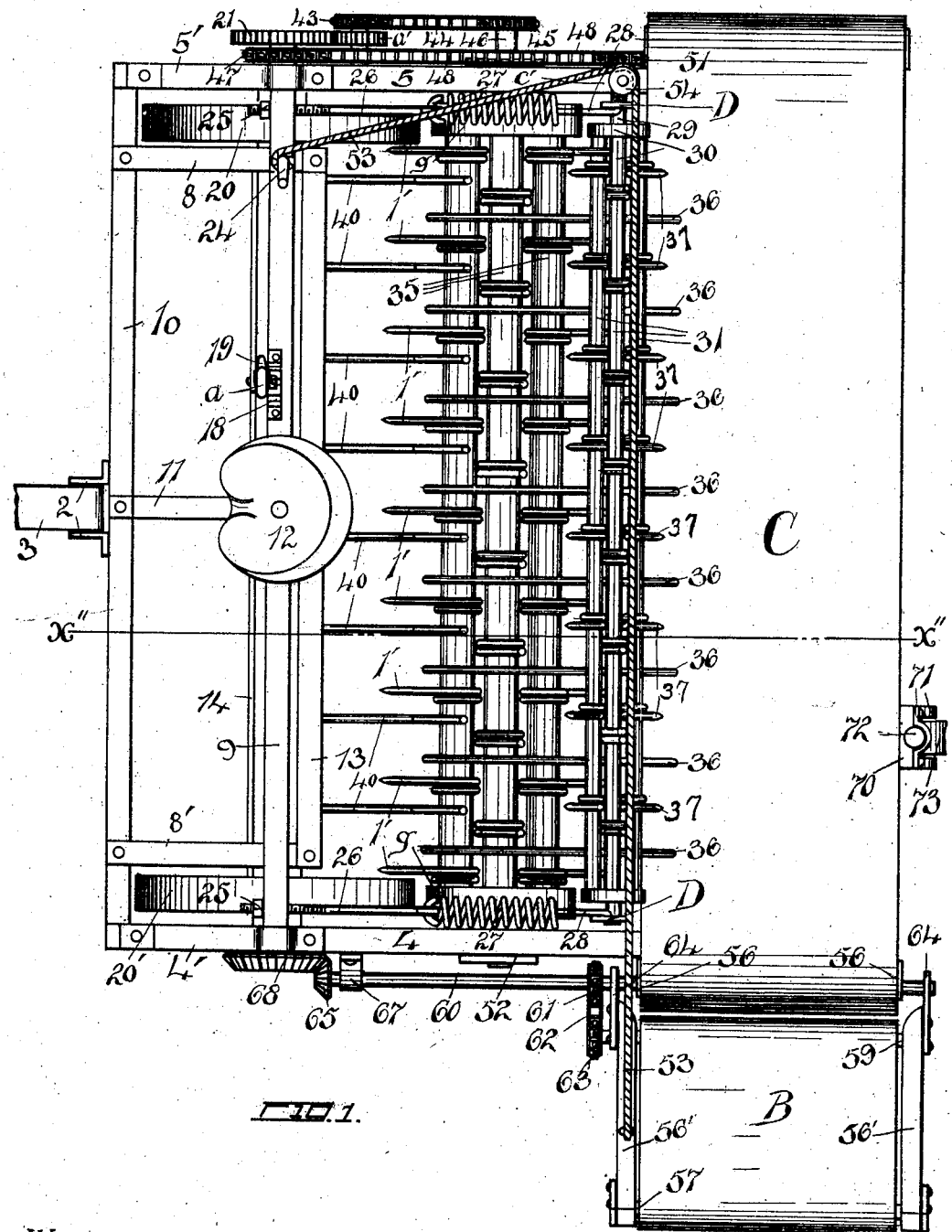

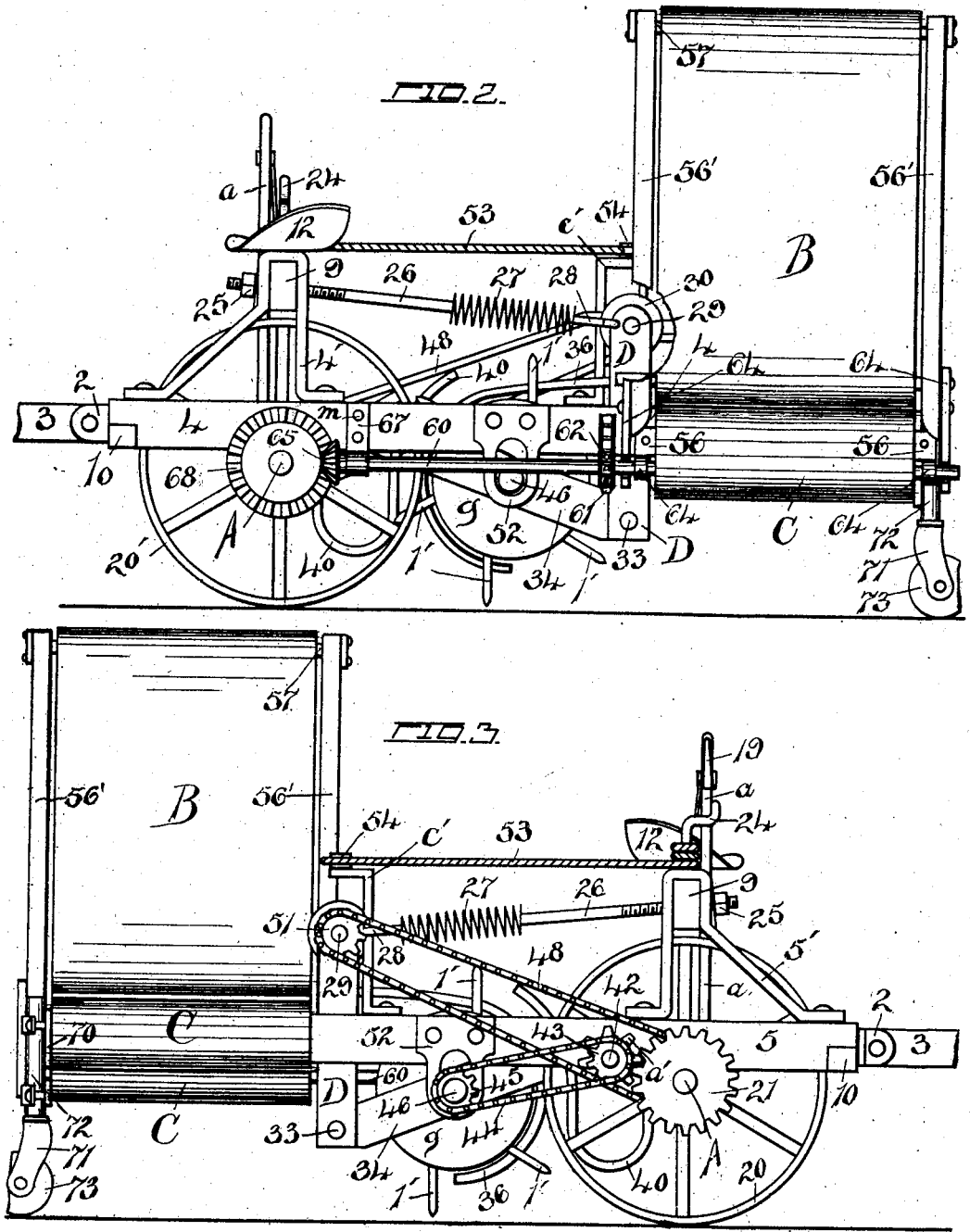

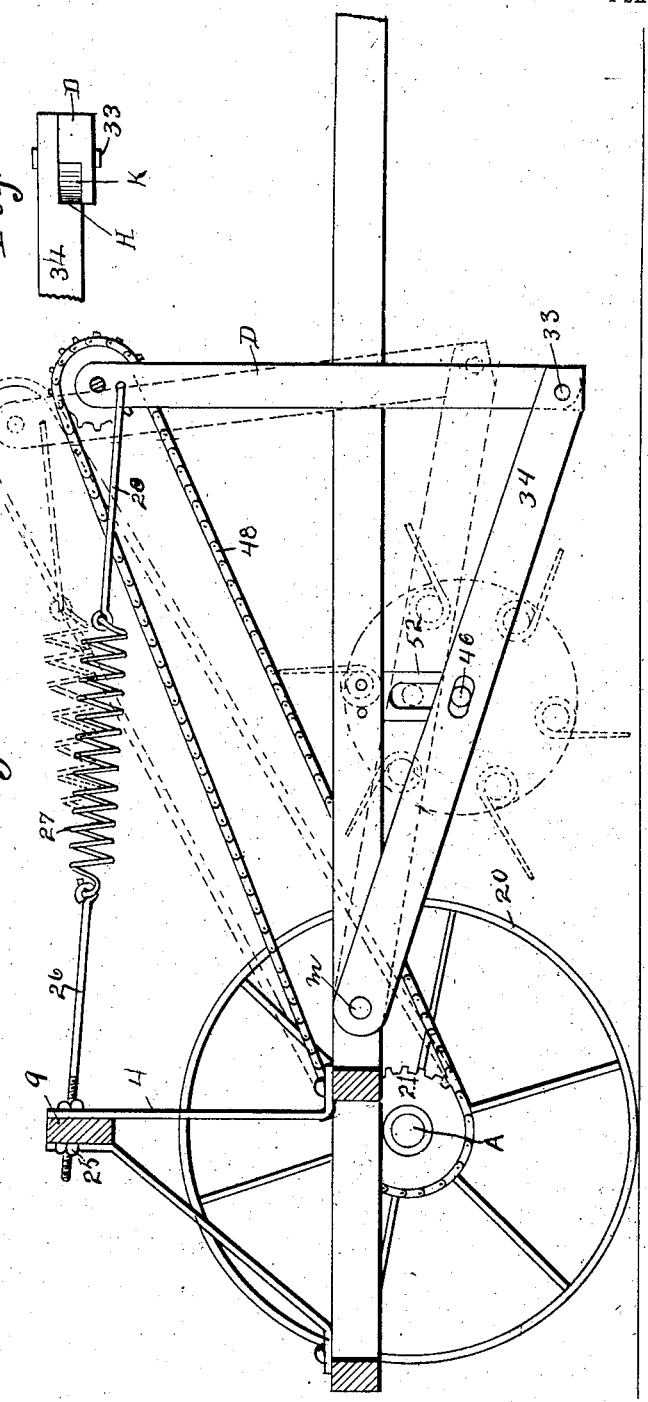

No. 761,752.  
Patented June 7, 1904.

UNITED STATES PATENT OFFICE.

JAMES H. BOGGESS AND WILLIAM HOTZE, OF CARSON, IOWA.

COMBINATION HAY IMPLEMENT.

SPECIFICATION forming part of Letters Patent No. 761,752, dated June 7, 1904.

Application filed April 21, 1903. Serial No. 153,698. (No model.)

*To all whom it may concern:*

Be it known that we, JAMES H. BOGGESS and WILLIAM HOTZE, residing at Carson, in the county of Pottawattamie and State of Iowa, have invented certain useful Improvements in Combination Hay Implements; and we do hereby declare that the following is a full, clear, and exact description of the invention, such as will enable others skilled in the art to which it appertains to make and use the same, reference being had to the accompanying drawings, which form a part of this specification.

This invention relates to a combination hay implement.

The object of our invention is to provide a field implement adapted to be used as a rake to collect hay and to draw the hay onto an elevator, which elevates the hay to a wagon or hay-rack as our device is advanced over the ground-surface.

A further object is to provide a device of this class which can be also used as a hay-tedder when the elevator mechanism is removed from the gathering mechanism.

A further object is to provide a device for gathering and elevating hay of simple, durable, and inexpensive construction in which the parts are so assembled that no danger of clogging on the parts when the machine is in operation will be prevalent.

In the accompanying drawings, we have shown in Figure 1 a top view of a hay implement composing our invention. Fig. 2 is a side elevation. Fig. 3 is a side elevation of the opposite side from that shown in Fig. 2. Fig. 4 is a sectional view taken on line $x''$ of Fig. 1, and Fig. 5 discloses the arrangement of the sliding collars used in throwing the driving-wheels into or out of engagement with the main shaft. Fig. 6 shows a detail view of one side of the frame, showing the mechanism for springingly supporting the rotary rake-shaft and also in dotted lines said rake-shaft. Fig. 7 is an inverted plan view of the lower end of one of the rock-arms for supporting the rotary rake-shaft and also shows the way in which the rock-arms and the bars attached to them are connected.

In the accompanying drawings a rectangular frame is shown comprising the forward sill 10, the rear sill 7, the side sills 4 and 5, as disclosed in Figs. 1, 4, and 2. In order to strengthen this frame, we have provided the two upwardly-extending brackets 4' and 5', as disclosed in Figs. 1 and 2, which are secured to the side sills 4 and 5, and within these brackets 4' and 5' the transverse bar 9 is supported.

Extending rearwardly from the forward sill 10 are the frame members 8 and 8', which are connected at their rear ends by the bar 13. Depending from the side sills 4 and 5 are the bearings K. (Shown in Fig. 5.) In these bearings K a main driving-shaft A, which supports the wheels 20 and 20', is mounted. These wheels are rotatably mounted upon the shaft A and are provided with notched hubs $b'$. Slidingly held upon the main driving-shaft A are the lug-bearing sleeves $b$, the lugs of which are adapted to enter the notches of the hubs, so that when the lugs are in the notches the sleeve revolves the axle when the wheels revolve. Designed to engage these sleeves $b$ are the collars $c$, as clearly indicated in Fig. 5, to one of which is attached the connecting-bar 14 and to the other the connecting-bar 15 is attached, both of which in turn are pivotally attached to the pivotally-mounted lever $a$, which is held relative to the bars 13 and 9 by the pin 16 and the strap 17. The lever $a$ is provided with the usual thumb-latch 19, designed to coact with the notched sector 18, which is secured to the supporting-bar 9.

Whenever it is desired to throw the shaft A into operation the lever $a$ is operated to throw the sleeves $b$ into engagement with the notched hubs of the wheels 20 and 20'. Secured to one end of the main driving-shaft A is a bevel-gear 68, in mesh with the pinion 65, secured to the shaft 60. The shaft 60 is mounted at one end in the bearing 67 and at its central portion and other end in the bearings 56, all of which bearings are secured to the sill 4. Mounted at the rear end of the shaft 60 is a drum, outside of which is an elevator-belt C, extending across the rear end of our device, as shown in Figs. 1, 2, and 3.

Mounted on the shaft 60 is a sprocket-wheel

61. A shaft 59 is rotatably mounted at the outer side of the shaft 60 in the bars 56' 56', and these bars are connected with the shaft 60 by arms 64, as shown in Fig. 1. Mounted on the forward end of the shaft 59 is the sprocket-wheel 63. Passing around the sprocket-wheels 61 and 63 is a sprocket-chain 62, so that when the shaft 60 is operated the shaft 59 will be correspondingly operated. Mounted between the outer ends of the bars 56' 56' is the shaft 57. Mounted on each of the shafts 57 and 59 is a suitable drum, and around these drums an elevating-conveyer B is mounted and is driven when the shaft 59 is driven from the shaft 60. The horizontal or lateral conveyer C is designed to receive the substance thrown upon it as the machine is advanced over the ground-surface and move said substance to the elevating-conveyer B, which elevates it to its upper outer end and allows it to drop onto a wagon or hay-rack provided for the purpose. Near the opposite end of this main driving-shaft A from that to which the bevel-gear 68 is attached is a sprocket-wheel 47, (shown in Fig. 1,) over which passes a sprocket-chain 48. (Shown in Fig. 3.) The chain 48 also passes over a sprocket-wheel 51, secured to the shaft 29, which shaft extends across the frame and is held within the rock-arms D. (Shown in Figs. 1 and 3.)

Mounted on the shaft A immediately outside of the sprocket-wheel 47 is a gear 21, in mesh with the gear $a'$, which is mounted upon the stub-shaft 42. Mounted upon the shaft 42 and attached to the gear is a sprocket-wheel 43. Extending transversely of the frame at the rear of the driving-shaft A is the rotary rake-shaft 46, which is supported from the sills 4 and 5 by means of the slotted bearings 52. Firmly attached to the rotary rake-shaft 46 and on that end of it which is on the same side of the machine as the gear $a'$ is a sprocket-wheel 45. Passing around the sprocket-wheel 45 and the sprocket-wheel 43 is the sprocket-chain 44, said sprocket-chain and sprocket-wheels being so arranged that as the sprocket-wheel 43 is driven from the main driving-shaft the sprocket-wheel 45 will be driven, and thus cause the rotary rake-shaft 46 to be rotated. These sprocket-wheels and sprocket-chains are shown most clearly in Fig. 3 of the drawings.

Extending from one of the arms D to the sill 5 is a bar 34, through which the rotary rake-shaft 46 passes. Extending from the other of said arms D to the sill 4 is a corresponding bar 34, except, of course, that it is on the opposite side of the machine and is designed to support the opposite end of the shaft 46. These bars 34 are pivotally attached at their lower ends to the arms D and are designed to support said arms D and yet allow said arms to be swung on said pivotal points of attachment away from the bars 34. On each of the bars 34 there is a shoulder. Each of these bars 34 are cut away at their lower rear ends to form the shoulders H, against the upper portion of which the arms D are designed to rest, and thus prevent the arms from forward movement relative to the bars 34. The lower inner portion of each of these arms D is rounded slightly at $k$, so that the arms D will have a rearward rocking movement relative to the bars 34. The upper ends of said arms are attached to the sills 4 and 5, respectively, by means of the pivots $m$. Attached to the upper portion of the rock-arms D are the rods 28, to which are attached the springs 27. These springs are also attached to the screw-rods 26, that pass through the transverse supporting-bar 9, and said screw-rods are secured to said bar 9 by means of the nuts 25. Thus it will be clearly seen that the springs 27, which are connected with the cross-bar 9 and with the rock-arms D by the rods 26 and the connecting-links 28, respectively, will springingly maintain the rotary rake-shaft in position relative to the frame of the machine. The upward and downward movement of the rotary rake-shaft is limited by the slotted bearings 52. A suitable seat 12 is secured to the transverse bar 9.

Pivotally attached to the sill 10 by means of the ears 2 is a suitable tongue 3, to which the draft-animals are to be attached. Attached to the rear of the frame is a block 70, to which is attached a collar 72. A caster-wheel 73 is mounted beneath said block 70, having a stem 71 thereon, which is rotatably mounted in said collar. It will be seen that the rear of the frame will be supported by this caster as the implement is drawn over the ground-surface. Mounted on a suitable bearing fixed to the rear end of the sill 5 is a drum over which the conveyer C passes, and as this conveyer also passes over a drum which is secured to the shaft 60 the conveyer will be driven as the shaft 60 is rotated directly from the main driving-shaft A. Inasmuch as the conveyer C and the conveyer B are driven directly from the shaft 60, it will be seen that both of these conveyers are driven at the same rate of speed and uniformly.

Firmly attached near each end of the shaft 46 is a disk $g$. Connecting these disks $g$ are the shafts 35, which are preferably mounted equidistant from each other. Mounted on each of the shafts 35 is a series of spring-teeth 1', as shown in Fig. 1. Because the shaft 46 is so mounted that it can be moved upwardly and downwardly and also because said shaft is held in suspension by means of the spring 27 the rock-arms D raise and lower, according to the strain applied to the rotary rake, which is composed of the shafts 35 and the teeth 1', mounted upon them. We have provided a hay-advancing mechanism comprising a shaft 29, which is provided with disks which are mounted near each end thereof, and said disks are designated by the numeral 30. Connecting these disks are the shafts 31, similar to the shafts 35, except that they are smaller in size, and upon these shafts 31 the spring-teeth 37 are mounted. The shaft 29 is moved forwardly or rearwardly and rises and falls with the rock-arms D, owing to the fact that these are connected with the spring 27. Thus the position of these shafts 29 and 46 is determined by the adjustment of the spring 27. Extending from the transverse frame member 6 are the slats 36, which pass partially around the rotary rake and between its teeth. These slats 36 are made of a springing material, so that as the rake is forced upwardly from whatever cause the slats will be swung upwardly a slight distance, and thus prevent the breaking of parts. Extending from the transverse frame member 13 are the U-shaped spring-teeth 40, between which the rake-teeth 1' move as the rake is rotated, the idea being for the rake to pick up the hay and force it upwardly and rearwardly on the slats 36, while the U-shaped teeth 40 prevent the hay from being thrown forwardly as the rake is rotated. Thus the hay will be thrown onto the conveyer C at the rear of the rake, and this conveyer will advance the hay to the conveyer B, which is designed to elevate it and deposit it into a suitable vehicle. When the hay reaches a point immediately beneath the shaft 29, which is constantly being rotated, the teeth which are mounted on the rods 31 will engage the hay and assist in throwing it rearwardly onto the conveyer-belt C. In order to regulate the angle of the elevating-conveyer B, we attach the rope 53 to one of the bars 56' and pass this rope over a pulley 54, which is mounted at the opposite side of the machine from the conveyer B, and attach the end of the rope to the crank-shaft 24, upon which it is designed to be wound or unwound to elevate or lower the conveyer B. When it is desired to use the machine as a tedder, the conveyers are simply removed from the device, and it is then in readiness for using in this way.

In practical operation the springs 27 are adjusted, by means of the screw-rods 26 and the nuts 25, so that the rake and the shaft 29 are in the desired positions, and the elevating-conveyer is fixed at the desired elevation, and the draft-animals are attached in the ordinary way. The machine is then drawn over the ground-surface, and as it is drawn forwardly the entire mechanism is set into full operation unless it is thrown out of gear by the above-described mechanism.

Having thus described our invention, what we claim, and desire to secure by Letters Patent of the United States therefor, is—

1. In a device of the class described, a frame, wheels mounted on said frame for supporting it, a main driving-shaft connecting the wheels, a rotary rake designed to throw the hay forwardly, upwardly and then rearwardly, means connected with said rake and with the main driving-shaft for operating it when the shaft is rotated, and slats attached at the rear of said rotary rake and extending partially around it, for the purposes stated.

2. In a device of the class described, a frame, wheels mounted on said frame for supporting it, a main driving-shaft connecting the wheels, a rotary rake designed to throw the hay forwardly, upwardly and then rearwardly, means connected with said rake and with the main driving-shaft for operating it when the shaft is rotated, slats attached at the rear of said rotary rake and extending partially around it, and a hay-advancing mechanism mounted above the rear of said frame and partially above said rake, operatively connected with the main driving-shaft, for the purposes stated.

3. In a device of the class described, a frame, wheels mounted on said frame for supporting it, a main driving-shaft connecting the wheels, a rotary rake designed to throw the hay forwardly, upwardly and then rearwardly, means connected with said rake and with the main driving-shaft for operating it when the shaft is rotated, slats attached at the rear of said rotary rake and extending partially around it, a hay-advancing mechanism mounted above the rear of said frame and partially above said rake, operatively connected with the main driving-shaft, and a lateral conveyer mounted at the rear of said frame and partially beneath the rear portion of said slats, operatively connected with the main driving-shaft.

4. In a device of the class described, a frame, wheels mounted on said frame for supporting it, a main driving-shaft connecting the wheels, a rotary rake designed to throw the hay forwardly, upwardly and then rearwardly, means connected with said rake and with the main driving-shaft for operating it when the shaft is rotated, slats attached at the rear of said rotary rake and extending partially around it, a hay-advancing mechanism mounted above the rear of said frame and partially above said rake, operatively connected with the main driving-shaft, a lateral conveyer mounted at the rear of said frame and partially beneath the rear portion of said slats, and an elevating-conveyer mounted at one side of the rear of said frame, said conveyers being operatively connected with the main driving-shaft.

5. In a device of the class described, the combination of a main driving-shaft extending transversely of the forward portion of said frame, wheels mounted on said shaft for supporting the frame, a caster mounted at the rear end of said frame, a series of spring-teeth attached near the forward end of said frame and between the side portions thereof, a rotary rake connected with said frame and extending transversely of it, teeth in said rake designed to pass between said spring-teeth, slats attached to the rear of the frame and extending partially around said rotary rake, means operatively connected with the rotary rake and with the main driving-shaft for driving said rake as the device is drawn over the ground-surface in such a way that the hay will be forced between said spring-teeth and said slats and then rearwardly on said slats.

6. In a device of the class described, the combination of a main driving-shaft extending transversely of the forward portion of said frame, wheels mounted on said shaft for supporting the frame, a caster mounted at the rear end of said frame, a series of spring-teeth attached near the forward end of said frame and between the side portions thereof, a rotary rake connected with said frame and extending transversely of it, teeth in said rake designed to pass between said spring-teeth, slats attached to the rear of the frame and extending partially around said rotary rake, means operatively connected with the rotary rake and with the main driving-shaft for driving said rake as the device is drawn over the ground-surface in such a way that the hay will be forced between said spring-teeth and said slats and then rearwardly on said slats, and a hay-advancing mechanism mounted above the rear portion of said slats and operatively connected with the main driving-shaft, for the purposes stated.

7. In a device of the class described, the combination of a main driving-shaft extending transversely of the forward portion of said frame, wheels mounted on said shaft for supporting the frame, a caster mounted at the rear end of said frame, a series of spring-teeth attached near the forward end of said frame and between the side portions, thereof, a rotary rake connected with said frame and extending transversely of it, teeth in said rake designed to pass between said spring-teeth, slats attached to the rear of the frame and extending partially around said rotary rake, means operatively connected with the rotary rake and with the main driving-shaft for driving said rake as the device is drawn over the ground-surface in such a way that the hay will be forced between said spring-teeth and said slats and then rearwardly on said slats, and a hay-advancing mechanism mounted above the rear portion of said slats and operatively connected with the main driving-shaft, a lateral conveyer mounted at the rear of said frame and partially beneath the rear portion of said slats, said conveyer being operatively connected with the main driving-shaft.

8. In a device of the class described, the combination of a main driving-shaft extending transversely of the forward portion of said frame, wheels mounted on said shaft for supporting the frame, a caster mounted at the rear end of said frame, a series of spring-teeth attached near the forward end of said frame and between the side portions, thereof, a rotary rake connected with said frame and extending transversely of it, teeth in said rake designed to pass between said spring-teeth, slats attached to the rear of the frame and extending partially around said rotary rake, means operatively connected with the rotary rake and with the main driving-shaft for driving said rake as the device is drawn over the ground-surface in such a way that the hay will be forced between said spring-teeth and said slats and then rearwardly on said slats, a hay-advancing mechanism mounted above the rear portion of said slats and operatively connected with the main driving-shaft, a lateral conveyer mounted at the rear of said frame and partially beneath the rear portion of said slats, and an elevating-conveyer mounted adjacent to the lateral conveyer, said conveyers being operatively connected with the main driving-shaft of the device.

9. In a device of the class described, a frame, a driving-shaft extending across the forward portion of said frame, driving-wheels mounted on said shaft, a rotary rake mounted in said frame and behind said shaft, springing slats attached to the rear, upper portion of the frame and extending over and partially around said rotary rake, a rotary hay-advancing mechanism mounted above the rear end of said frame, means for springingly maintaining the rotary rake and the hay-advancing mechanism in position relative to said frame, means for operatively connecting the rotary rake with the driving-shaft, means for operatively connecting the hay-advancing mechanism with the driving-shaft, and means for adjusting the means for springingly maintaining the rotary rake and the hay-advancing mechanism in position relative to the frame.

10. In a device of the class described, a frame, wheels for supporting said frame, a rotary rake extending transversely of the frame, means for springingly supporting said rotary rake, means designed to be connected with the driving-wheels of the device for operating said rotary rake, and springing slats attached at the rear upper portion of said frame and extending over and partially around said rotary rake, and springing teeth mounted adjacent to the front of the frame of the rotary rake and extending partially above it, for the purposes stated.

11. In a device of the class described, a frame, wheels for supporting said frame, a rotary rake extending transversely of the frame, means for springingly supporting said rotary rake, means designed to be connected with the driving-wheels of the device for operating said rotary rake, springing slats attached at the rear upper portion of said frame and extending over and partially around said rotary rake, springing teeth mounted adjacent to the front of the frame of the rotary rake and extending partially above it, a lateral conveyer mounted at the rear of said frame and partially beneath said slats, and an elevating-conveyer at one side of the frame, and means for operatively connecting the conveyers with the driving-wheels.

12. In a device of the class described, the combination of a frame, a driving-shaft extending across the forward portion of said frame, driving-wheels rotatably mounted on said driving-shaft, pivotally-mounted bars attached to the sides of said frame, pivotally-mounted rock-arms attached to the rear ends of said bars, a rotary rake mounted between said bars, a rotary hay-advancing mechanism mounted between the upper ends of said rock-arms, and adjustable springing means attached to the upper portion of said rock-arms and to said frame, for the purposes stated.

13. In a device of the class described, the combination of a frame, a driving-shaft extending across the forward portion of said frame, driving-wheels rotatably mounted on said driving-shaft, pivotally-mounted bars attached to the sides of said frame, pivotally-mounted rock-arms attached to the rear ends of said bars, a rotary rake mounted between said bars, a rotary hay-advancing mechanism mounted between the upper ends of said rock-arms, adjustable springing means attached to the upper portion of said rock-arms and to said frame, slotted guides attached to the sides of said frame through which the shaft which supports the rotary rake passes, designed to maintain the rotary rake against horizontal movement, and a caster for supporting the rear of said frame.

14. In a device of the class described, the combination of a frame, a driving-shaft extending across the forward portion of said frame, driving-wheels rotatably mounted on said driving-shaft, pivotally-mounted bars attached to the sides of said frame, pivotally-mounted rock-arms attached to the rear ends of said bars, a rotary rake mounted between said bars, a rotary hay-advancing mechanism mounted between the upper ends of said rock-arms, adjustable springing means attached to the upper portion of said rock-arms and to said frame, slotted guides attached to the sides of said frame through which the shaft which supports the rotary rake passes, designed to maintain the rotary rake against horizontal movement, a caster for supporting the rear of said frame, a lateral conveyer mounted at the rear end of said frame and an elevating-conveyer mounted at one side of the rear of said frame, and means for regulating the incline of said elevating-conveyer from the forward portion of the frame.

In testimony whereof we affix our signatures in presence of two witnesses.

JAMES H. BOGGESS.
WILLIAM HOTZE.

Witnesses:
CHAS. JOHANNSEN,
P. E. JOHANNSEN.